(12) United States Patent
Goldring et al.

(10) Patent No.: US 11,192,642 B2
(45) Date of Patent: Dec. 7, 2021

(54) NON-METALLIC ORIFICE PLATE

(71) Applicant: GOODRICH CORPORATION, Charlotte, NC (US)

(72) Inventors: Eric Goldring, Milton (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/276,246

(22) Filed: Feb. 14, 2019

(65) Prior Publication Data
US 2020/0262547 A1 Aug. 20, 2020

(51) Int. Cl.
*F16F 9/32* (2006.01)
*B64C 25/60* (2006.01)
*F16F 15/023* (2006.01)

(52) U.S. Cl.
CPC .......... *B64C 25/60* (2013.01); *F16F 15/0232* (2013.01); *F16F 2224/005* (2013.01); *F16F 2226/04* (2013.01)

(58) Field of Classification Search
CPC ............. F16F 5/00; F16F 9/029; F16F 9/3214
USPC ............................... 188/282.5, 282.9, 322.16
See application file for complete search history.

(56) References Cited

U.S. PATENT DOCUMENTS

| | | | | |
|---|---|---|---|---|
| 2,719,612 A | * | 10/1955 | Bourcier | F16F 9/36 188/314 |
| 2,838,300 A | * | 6/1958 | Gray | F16F 9/3214 267/128 |
| 3,053,593 A | * | 9/1962 | Blair | F16J 15/20 384/300 |
| 3,451,510 A | | 6/1969 | Hartwig | |
| 4,067,184 A | * | 1/1978 | Johnson, Jr. | F16F 1/3732 57/135 |
| 4,074,011 A | * | 2/1978 | Teramae | C23C 22/83 106/14.12 |
| 4,163,970 A | * | 8/1979 | Allinquant | F16F 9/029 188/1.11 E |
| 4,214,507 A | * | 7/1980 | Hock | B29C 45/1676 264/250 |
| 4,426,109 A | * | 1/1984 | Fike, Jr. | B60R 19/32 137/68.11 |
| 4,628,579 A | * | 12/1986 | Taylor | F16F 5/00 188/282.5 |

(Continued)

FOREIGN PATENT DOCUMENTS

EP 0074705 3/1983

OTHER PUBLICATIONS

European Patent Office, European Search Report dated Jul. 13, 2020 in Application No. 19214552.2.

*Primary Examiner* — Christopher P Schwartz
(74) *Attorney, Agent, or Firm* — Snell & Wilmer L.L.P.

(57) ABSTRACT

An orifice plate includes a wear-resistant inner diameter surface, an outer diameter surface, a first side surface extending between the wear-resistant inner diameter surface and the outer diameter surface, and a second side surface extending between the wear-resistant inner diameter surface and the outer diameter surface, the second side surface disposed opposite the orifice plate from the first side surface. The orifice plate may comprise a body portion comprising a first material. The wear-resistant inner diameter surface may comprise a second, wear-resistant material.

8 Claims, 3 Drawing Sheets

(56) References Cited

U.S. PATENT DOCUMENTS

| | | | | |
|---|---|---|---|---|
| 4,984,938 A * | 1/1991 | Scott, Jr. | ............ | E21D 21/0093 |
| | | | | 405/259.1 |
| 5,193,960 A * | 3/1993 | Fukushima | ........... | E21D 11/083 |
| | | | | 277/637 |
| 6,186,486 B1 * | 2/2001 | Gutman | ............... | B60G 13/003 |
| | | | | 188/322.12 |
| 6,277,008 B1 * | 8/2001 | Masuta | .................. | B24B 37/30 |
| | | | | 451/285 |
| 9,403,592 B2 | 8/2016 | Kallio | | |
| 10,494,544 B2 * | 12/2019 | Kim | ....................... | C08G 73/14 |
| 10,587,107 B2 * | 3/2020 | Morden | ................ | F16B 41/002 |
| 2003/0041967 A1 * | 3/2003 | Marquardt | .............. | B24B 37/32 |
| | | | | 156/345.12 |
| 2003/0051800 A1 * | 3/2003 | Myhill | .................. | B41J 2/1606 |
| | | | | 156/230 |
| 2004/0079599 A1 * | 4/2004 | May | ...................... | F16F 9/3214 |
| | | | | 188/282.5 |
| 2004/0112695 A1 * | 6/2004 | Niwa | ...................... | F16F 9/366 |
| | | | | 188/322.17 |
| 2007/0164151 A1 | 7/2007 | Luce | | |
| 2010/0225110 A1 * | 9/2010 | Christie | .................. | F16L 23/18 |
| | | | | 285/351 |
| 2015/0159723 A1 * | 6/2015 | Thein | .................... | F16F 9/3242 |
| | | | | 188/322.16 |
| 2016/0101662 A1 * | 4/2016 | Konakai | .................. | F16F 9/36 |
| | | | | 188/315 |
| 2016/0167791 A1 | 6/2016 | Roach et al. | | |

* cited by examiner

NON-METALLIC ORIFICE PLATE

FIELD

The present disclosure relates to shock strut systems, and more specifically, to orifice plates for shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Conventional orifice plates used in landing gear shock struts are made entirely of metallic components.

SUMMARY

A non-metallic orifice plate is disclosed, comprising a wear-resistant inner diameter surface, an outer diameter surface, a first side surface extending between the wear-resistant inner diameter surface and the outer diameter surface, and a second side surface extending between the wear-resistant inner diameter surface and the outer diameter surface, the second side surface disposed opposite the non-metallic orifice plate from the first side surface, wherein the non-metallic orifice plate comprises at least one of a thermoplastic and a thermoset carbon fiber reinforced composite.

In various embodiments, the non-metallic orifice plate comprises a body portion comprising a first material.

In various embodiments, the wear-resistant inner diameter surface comprises a second material.

In various embodiments, the first material comprises the thermoplastic and/or the thermoset carbon fiber reinforced composite.

In various embodiments, the second material comprises a polytetrafluoroethylene.

In various embodiments, the non-metallic orifice plate further comprises a wear insert disposed in the body portion of the non-metallic orifice plate.

In various embodiments, the wear insert defines the wear-resistant inner diameter surface.

In various embodiments, the orifice further comprises a wear-resistant coating comprising the second material disposed on the body portion and defining the wear-resistant inner diameter surface.

A shock strut is disclosed, comprising a strut cylinder, a strut piston operatively coupled to the strut cylinder, a non-metallic orifice plate, and a metering pin extending through the non-metallic orifice plate, wherein the non-metallic orifice plate comprises a wear-resistant inner diameter surface, an outer diameter surface, a first side surface extending between the wear-resistant inner diameter surface and the outer diameter surface, and a second side surface extending between the wear-resistant inner diameter surface and the outer diameter surface, the second side surface disposed opposite the non-metallic orifice plate from the first side surface, wherein the non-metallic orifice plate comprises at least one of a thermoplastic and a thermoset carbon fiber reinforced composite.

In various embodiments, the non-metallic orifice plate comprises a body portion comprising a first material.

In various embodiments, the wear-resistant inner diameter surface comprises a second material.

In various embodiments, the first material comprises at least one of the thermoplastic and the thermoset carbon fiber reinforced composite.

In various embodiments, the second material comprises a polytetrafluoroethylene.

In various embodiments, the non-metallic orifice plate further comprises a wear insert disposed in the body portion of the non-metallic orifice plate, wherein the wear insert defines the wear-resistant inner diameter surface.

In various embodiments, the non-metallic orifice plate further comprises a wear-resistant coating comprising the second material disposed on the body portion and defining the wear-resistant inner diameter surface.

A method for manufacturing a non-metallic orifice plate is disclosed, comprising forming a body portion of the non-metallic orifice plate, and forming a wear-resistant inner diameter surface of the non-metallic orifice plate, wherein the body portion comprises a first material and the wear-resistant inner diameter surface comprises a second material.

In various embodiments, the wear-resistant inner diameter surface is formed by applying a wear-resistant coating to an inner diameter surface of the body portion.

In various embodiments, the wear-resistant inner diameter surface is formed by applying a wear-resistant coating to an inner diameter surface of the body portion.

In various embodiments, the first material comprises a polytetrafluoroethylene.

In various embodiments, the second material comprises at least one of a thermoplastic or a thermoset carbon fiber reinforced composite.

The forgoing features and elements may be combined in various combinations without exclusivity, unless expressly indicated herein otherwise. These features and elements as well as the operation of the disclosed embodiments will become more apparent in light of the following description and accompanying drawings.

Figures 1A, 1B:
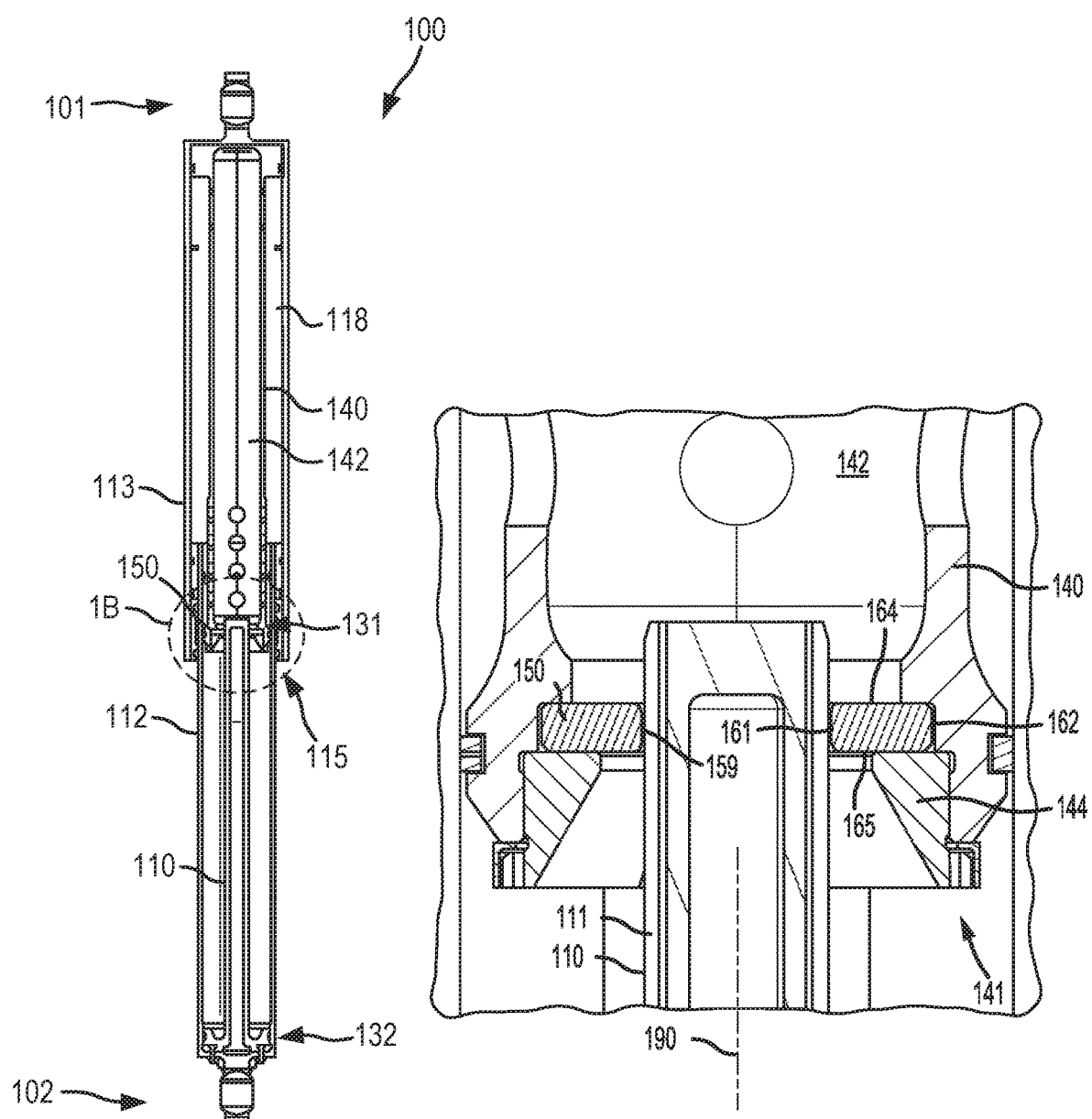
FIG. 1A illustrates a schematic of a shock strut comprising a non-metallic orifice plate having a wear-resistant inner diameter surface, in accordance with various embodiments.
FIG. 1B illustrates an enlarged view of the non-metallic orifice plate having the wear-resistant inner diameter surface coupled to the shock strut of FIG. 1A, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As disclosed herein, a 100% non-metallic orifice plate may comprise a wear-resistant inner diameter surface, an outer diameter surface, a first side surface extending between the inner diameter surface and the outer diameter surface, and a second side surface extending between the inner diameter surface and the outer diameter surface, the second side surface disposed opposite the non-metallic orifice plate from the first side surface. The disclosed non-metallic orifice plate may provide weight-savings, while maintaining wear resistance at the inner diameter surface.

With reference to FIG. 1A, a section view of a shock strut 100 in a fully extended position is illustrated, in accordance with various embodiments. Shock strut 100 may be configured to absorb and dampen forces transmitted between a vehicle and the ground. Shock strut 100 may comprise a strut piston 112 and a strut cylinder 113. Strut cylinder 113 may be configured to receive strut piston 112 in a manner that allows the two components to telescope together and absorb and dampen forces transmitted between a first end 101 (also referred to herein as a proximal end) and a second end 102 (also referred to herein as a distal end) of shock strut 100. In various embodiments, a fluid, such as a hydraulic fluid, and oil, and/or a gas is located within strut cylinder 113. Strut cylinder 113 and strut piston 112 may, for example, be configured to seal such that liquid contained within strut cylinder 113 is prevented from leaking as strut piston 112 translates relative to strut cylinder 113. Further, strut cylinder 113 may be configured to contain a gas such as nitrogen gas or air. Shock strut 100 may comprise a proximal end 101 and a distal end 102, wherein the distal end 102 is opposite the proximal end 101, the distal end 102 being the end of the shock strut closest to a wheel or wheel assembly of a vehicle. A gas chamber may be positioned above an oil chamber (referred to as an "air-over-oil" arrangement) or vice versa, where the term "above" in this context means in the direction of the proximal end 101 of the shock strut 100. Similarly, strut cylinder 113 and strut piston 112 may be sealed such that gas is prevented from leaking as strut piston 112 moves relative to strut cylinder 113. As such, shock strut 100 may comprise a pressurized environment within strut cylinder 113.

In various embodiments, the strut cylinder 113 may comprise a hollow circular tube having various components disposed within. Strut cylinder 113 may comprise a strut chamber 118. Strut cylinder 113 may comprise an orifice support tube 140. Orifice support tube 140 may comprise a hollow tube having a plurality of orifices through which oil or gas may travel. In this regard, orifice support tube 140 may comprise a tube channel 142 in fluid communication with strut chamber 118. In this regard strut chamber 118 may comprise tube channel 142 defined by orifice support tube 140. Various fluids may be disposed in strut chamber 118. Air may be disposed within strut chamber 118. Oil may be disposed within strut chamber 118, whether alone or in combination with a gas such as air or nitrogen gas.

In various embodiments, strut piston 112 may comprise a hollow circular tube. At least a portion of strut piston 112 may be received by open end 115 of strut cylinder 113. Strut piston 112 may comprise a metering pin 110. Metering pin 110 may move with strut piston 112 with respect to strut cylinder 113. Metering pin 110 may be received in orifice support tube 140. Strut piston 112 may be reciprocally received within the strut cylinder 113. In various embodiments, strut piston 112 may be reciprocally received within strut cylinder 113 in a concentric relationship with and between the strut cylinder 113 and orifice support tube 140. In various embodiments, one or more bearings may be disposed between strut cylinder 113 and strut piston 112 against which the strut piston 112 slides.

In various embodiments, metering pin 110 may comprise a first end 131 (also referred to herein as a proximal end) and a second end 132 (also referred to herein as a distal end). Second end 132 may be coupled to strut piston 112. First end 131 may be received into orifice support tube 140. In various embodiments, the strut cylinder 113 may comprise a non-metallic orifice plate 150 (also referred to herein as an orifice plate). Metering pin 110 may be received by orifice plate 150. Metering pin 110 may slide against an inner diameter (ID) surface of orifice plate 150. In this regard, metering pin 110 may extend through orifice plate 150.

With reference to FIG. 1B, an enlarged view of orifice plate 150 installed in shock strut 100 is illustrated, in accordance with various embodiments. In various embodiments, orifice plate 150 may be coupled to orifice support tube 140. Orifice plate 150 may be disposed in orifice support tube 140. The outer portion (i.e., at outer diameter (OD) surface 162) of orifice plate 150 may be coupled to orifice support tube 140. A threaded fastener 144 may be coupled to the open end 141 of orifice support tube 140. Orifice plate 150 may float between threaded fastener 144 and orifice support tube 140.

Orifice plate 150 may be comprised of a non-metallic material, such as a thermoplastic or a thermoset carbon fiber reinforced composite, for example. Orifice plate 150 may comprise an inner diameter (ID) surface 161 and an outer diameter (OD) surface 162. Orifice plate 150 may comprise a wear surface 159. Wear surface 159 may define the ID surface 161 of orifice plate 150. Wear surface 159 may provide a wear resilient surface against which metering pin 110 may slide. In this manner, orifice plate 150 may provide weight-savings while maintaining wear resistance at ID surface 161.

Orifice plate 150 may comprise a first side surface 164 extending between the inner diameter surface 161 and the outer diameter surface 162. Orifice plate 150 may comprise a second side surface 165 extending between the inner diameter surface 161 and the outer diameter surface 162. The second side surface 165 is disposed opposite the orifice plate 150 from the first side surface 164.

In various embodiments, metering pin 110 may be hollow. In various embodiments, metering pin 110 may comprise a plurality of channels 111 extending axially along the outer surface of metering pin 110 whereby a flow of a fluid between strut piston 112 and strut cylinder 113 is metered, with momentary reference to FIG. 1A. Plurality of channels 111 may extend parallel with centerline axis 190 of metering pin 110. In this regard, a fluid may flow from within strut piston 112 to strut chamber 118, via plurality of channels 111, in response to shock strut 100 moving towards a compressed position. Inversely, the fluid may flow from within strut chamber 118 to strut piston, via plurality of channels 111, in response to shock strut 100 moving towards an extended position. The size of each channel 111 may vary along the length of metering pin 110 such that the flow of the fluid between strut chamber 118 and strut piston 112 is metered dependent upon the position of strut piston 112 with respect to strut cylinder 113. For example, the depth of each channel 111 may be greater at first end 131 and may decrease in depth along the length of metering pin 110 towards second end 132. In this manner, metering pin 110 and orifice plate 150 may work together to meter a flow of fluid traveling between metering pin 110 and orifice plate 150, through channels 111, within shock strut 100.

Figure 2:
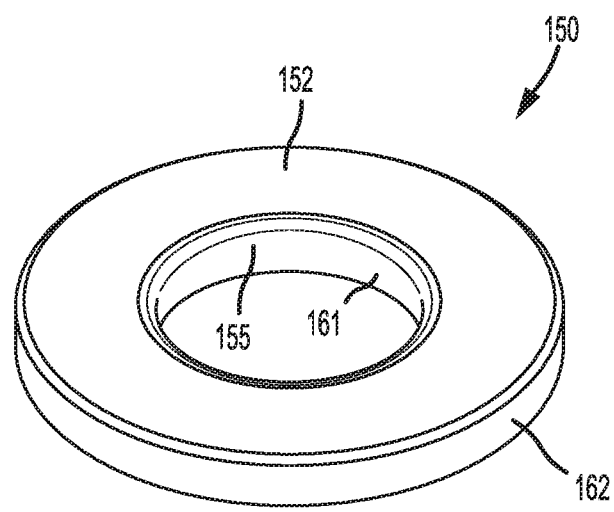
FIG. 2 illustrates a perspective view of the non-metallic orifice plate having the wear-resistant inner diameter surface, in accordance with various embodiments.

With reference to FIG. 2, an isometric view of orifice plate 150 is illustrated, in accordance with various embodiments. Orifice plate 150 may comprise a body portion 152 comprising an annular geometry. In various embodiments, orifice plate 150 may comprise a wear-resistant material, such as polytetrafluoroethylene (PTFE) or a metal such as an electroless nickel plating, a bronze-based coating, a copper-based coating, or the like. In this regard, the ID surface 161 may be wear-resistant to mitigate wear of ID surface 161 in response to metering pin 110 sliding against ID surface 161.

Figure 3:
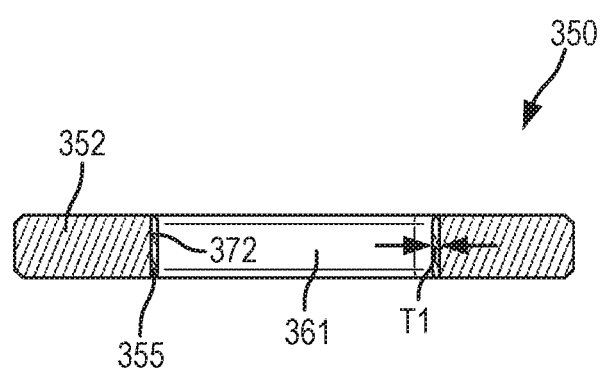
FIG. 3 illustrates a section view of a non-metallic orifice plate having a wear-resistant coating defining a wear-resistant inner diameter surface, in accordance with various embodiments.

With reference to FIG. 3, a section view of an orifice plate 350 is illustrated, in accordance with various embodiments Orifice plate 350 may be similar to orifice plate 150 of FIG. 1. Orifice plate 350 may comprise a body portion 352 and a wear-resistant coating 355 disposed on the ID surface 372 of body portion 352. In this regard, wear-resistant coating 355 may define the ID surface 361 of orifice plate 350. In various embodiments, wear-resistant coating 355 may be a thin-layer, wear-resistant coating comprising a thickness T1 of less than 0.1 millimeters (0.003937 inches). In various embodiments, the thickness T1 of wear-resistant coating 355 may be less than 0.01 millimeters (0.0003937 inches). Wear-resistant coating 355 may be applied to ID surface 372 of body portion 352 using an electroplating process, an electroless plating process, a thermal spray process, physical vapor deposition (PVD), chemical vapor deposition (CVD), or any other suitable coating process.

In various embodiments, body portion 352 is comprised of a lightweight thermoplastic material, such as polyethylene (PE), polypropylene, polyvinyl chloride (PVC), or the like. In various embodiments, body portion 352 is comprised of a thermoset carbon fiber reinforced composite. In this regard, body portion 352 may result in reduced weight of the overall shock strut 100 as compared to orifice plates comprised of a metal material or other material which is heavier, per unit volume, than a thermoplastic material or a thermoset carbon fiber reinforced composite. In various embodiments, wear-resistant coating 355 may be comprised of a wear-resistant material, such as polytetrafluoroethylene, or a metal, for example. In this manner, orifice plate 350 may provide weight-savings while maintaining wear resistance at ID surface 361.

Figure 4A:
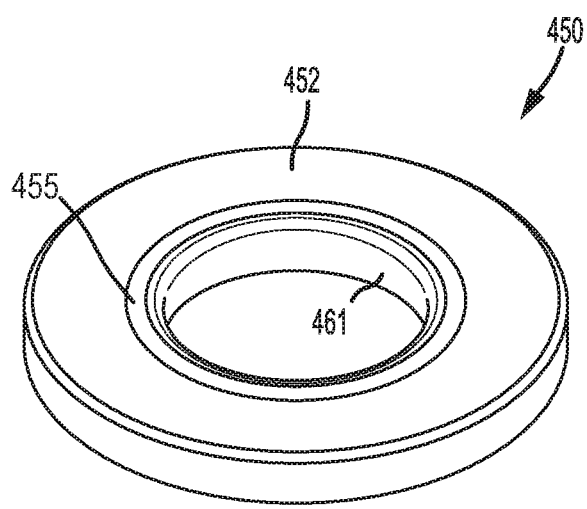
FIG. 4A illustrates a perspective view of a non-metallic orifice plate having a wear-resistant insert defining a wear-resistant inner diameter surface, in accordance with various embodiments.
Figure 4B:
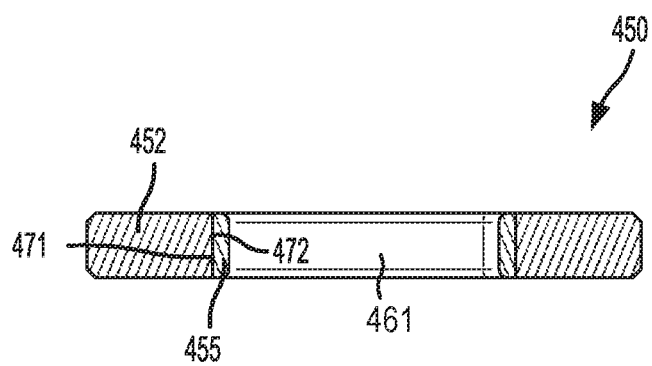
FIG. 4B illustrates a section view of the non-metallic orifice plate having the wear-resistant insert defining the wear-resistant inner diameter surface of FIG. 4A, in accordance with various embodiments.

With reference to FIG. 4A, a section view of an orifice plate 450 is illustrated, in accordance with various embodiments Orifice plate 450 may be similar to orifice plate 150 of FIG. 1. Orifice plate 450 may comprise a body portion 452 and a wear-resistant insert 455 coupled to the ID surface 472 of body portion 452. In this regard, wear-resistant insert 455 may define the ID surface 461 of orifice plate 450. In various embodiments, body portion 452 is comprised of a lightweight thermoplastic material, such as polyethylene (PE), polypropylene, polyvinyl chloride (PVC), or the like. In various embodiments, body portion 452 is comprised of a thermoset carbon fiber reinforced composite. In this regard, body portion 452 may result in reduced weight of the overall shock strut 100 as compared to orifice plates comprised of a metal material or other material which is heavier, per unit volume, than a thermoplastic material or a thermoset carbon fiber reinforced composite. In various embodiments, wear-resistant insert 455 may be comprised of a wear-resistant material, such as polytetrafluoroethylene for example. In this manner, orifice plate 450 may provide weight-savings while maintaining wear resistance at ID surface 461.

In various embodiments, wear-resistant insert 455 comprises an ID surface 461 and an OD surface 471. The OD surface 471 may mate against ID surface 472 of body portion 452. In various embodiments, OD surface 471 of wear-resistant insert 455 is coupled to ID surface 472 via a friction welding process. Stated differently, wear-resistant insert 455 may be friction welded to body portion 452. In various embodiments, OD surface 471 of wear-resistant insert 455 is coupled to ID surface 472 via an adhesive. Stated differently, wear-resistant insert 455 may be adhered to body portion 452.

Figure 5:
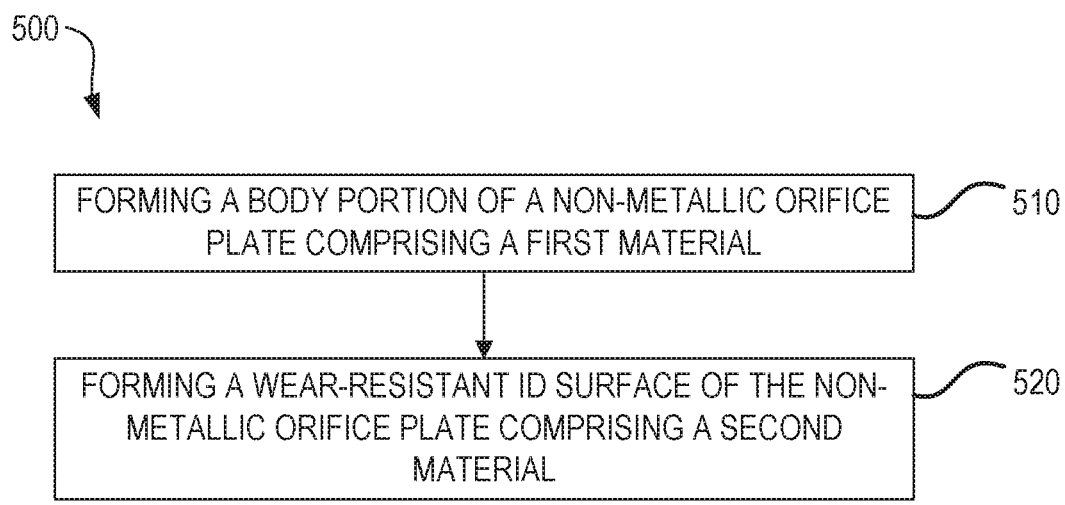
FIG. 5 illustrates a method for manufacturing a non-metallic orifice plate, in accordance with various embodiments.

With reference to FIG. 5, a flow chart providing a method 500 for manufacturing an orifice plate is illustrated, in accordance with various embodiments. Method 500 include forming a body portion of an orifice plate comprising a first material (step 510). Method 500 includes forming a wear-resistant inner diameter surface comprising a second material (step 520). Step 520 may be performed subsequent to step 510.

With combined reference to FIG. 3, FIG. 4A, and FIG. 4B, and FIG. 5, step 510 may include forming body portion 352. Step 510 may include forming body portion 452. Body portion 352 and body portion 452 may be formed using any suitable process including additive manufacturing methods, subtractive manufacturing methods, a molding process, or any combination thereof. Body portion 352 and/or body portion 452 may comprise a first material such as a thermoset carbon fiber reinforced composite or a thermoplastic material, including a polyethylene (PE), a polypropylene, a polyvinyl chloride (PVC), or the like Step 520 may include applying wear-resistant coating 355 on ID surface 372 of body portion 352 to form wear-resistant ID surface 361. Wear-resistant coating 355 may be formed using any suitable process including electroplating, electroless plating, thermal spraying, physical vapor deposition (PVD), chemical vapor deposition (CVD), or any other suitable coating process. Step 520 may include coupling wear-resistant insert 455 to body portion 452 to form wear-resistant ID surface 461. The outer diameter of wear-resistant insert 455 may be substantially equal to the inner diameter of body portion 452. Wear-resistant insert 455 may be coupled to body portion 452 using any suitable process including friction welding, using adhesive, or the like. Wear-resistant coating 355 and/or wear-resistant insert 455 may comprise a second material, different from the first material. The second material may be a wear-resistant material such as a polytetrafluoroethylene or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut, comprising:
   a strut cylinder;
   a strut piston operatively coupled to the strut cylinder;
   a non-metallic orifice plate; and
   a metering pin extending through the non-metallic orifice plate,
   wherein the non-metallic orifice plate comprises:
      a body portion comprising an inner diameter surface, an outer diameter surface, a first side surface extending between the inner diameter surface and the outer diameter surface, and a second side surface extending between the inner diameter surface and the outer diameter surface, the second side surface disposed opposite the non-metallic orifice plate from the first side surface; and
      a wear-resistant coating disposed on the inner diameter surface of the body portion, wherein the wear-resistant coating defines a wear-resistant inner diameter surface of the non-metallic orifice plate,
      the body portion comprises a first material, and
      the wear-resistant coating comprises a second material.

2. The shock strut of claim 1, wherein the first material comprises at least one of a thermoplastic and a thermoset carbon fiber reinforced composite.

3. The shock strut of claim 2, wherein the second material comprises a polytetrafluoroethylene.

4. The shock strut of claim 3, wherein the first material comprises the thermoplastic.

5. The shock strut of claim 3, wherein the first material comprises the thermoset carbon fiber reinforced composite.

6. The shock strut of claim 1, wherein the wear-resistant coating comprises a thickness T1 of less than 0.1 millimeters.

7. The shock strut of claim 1, wherein the wear-resistant coating comprises a thickness T1 of less than 0.01 millimeters.

8. The shock strut of claim 1, wherein the second material comprises a metal and the wear-resistant coating comprises a thickness of less than 0.1 millimeters.

* * * * *